United States Patent [19]

Boverio

[11] Patent Number: 5,602,533

[45] Date of Patent: Feb. 11, 1997

[54] DEVICE FOR SENSING A STATE CHANGE IN A MECHANICAL SYSTEM, METHOD FOR MONITORING THE STATE OF A MECHANICAL SYSTEM AND USE OF SAID DEVICE

[76] Inventor: Antonello Boverio, 1445 Vuiteboeuf, Switzerland

[21] Appl. No.: 453,644

[22] Filed: May 30, 1995

[30] Foreign Application Priority Data

Oct. 4, 1993 [CH] Switzerland ............................ 3076/93
Sep. 30, 1994 [WO] WIPO ..................... PCT/CH94/00196

[51] Int. Cl.$^6$ ................................................ G08B 21/00
[52] U.S. Cl. ........................ 340/686; 340/679; 340/683; 340/680; 364/551.02; 364/559; 73/590; 367/408
[58] Field of Search ..................................... 340/686, 679, 340/683, 680, 621, 617, 612, 545, 541; 73/584, 587, 588, 589, 590, 593, 600, 603, 605, 606, 607, 608, 200 V; 367/908; 364/551.02, 557, 558, 552, 559, 560, 553

[56] References Cited

U.S. PATENT DOCUMENTS

| H465 | 5/1988 | Brown | 73/590 |
|---|---|---|---|
| 2,164,125 | 6/1939 | Sokoloff | 73/607 |
| 2,971,372 | 2/1961 | Lewis et al. | 73/600 |
| 3,531,983 | 10/1970 | Heath et al. | 73/584 |
| 3,877,294 | 4/1975 | Shaw | 73/584 |
| 4,074,246 | 2/1978 | Conklin et al. | 340/545 |
| 4,102,177 | 7/1978 | Okada et al. | 364/558 |
| 4,541,064 | 9/1985 | Livingston | 364/552 |
| 4,590,803 | 5/1986 | Harrold | 73/590 |
| 4,669,312 | 6/1987 | Maurer | 73/600 |
| 4,679,430 | 7/1987 | Scott-Kestin et al. | 340/621 |
| 4,853,863 | 8/1989 | Cohen et al. | 340/460 |
| 5,009,102 | 4/1991 | Afromowitz | 73/590 |
| 5,015,995 | 5/1991 | Holroyd | 340/621 |
| 5,274,566 | 12/1993 | Reed et al. | 364/551.02 |
| 5,289,387 | 2/1994 | Higo et al. | 364/553 |
| 5,372,042 | 12/1994 | Jarman et al. | 73/588 |

Primary Examiner—Jeffery Hofsass
Assistant Examiner—Benjamin C. Lee

[57] ABSTRACT

A device for sensing a state change of a mechanical system, comprises at least one sound emitter (E), a receiver (R) as well as an electronic circuit (4) which allows to compare the received sound signal with reference values. The state of the mechanical system, such as the existence or the absence of contact among parts, is monitored by the processing of the signals corresponding to the emitted and received sound signals with the aim to allow to recognize the monitored state by the difference between the received signals and reference values. The sensing device may be used to monitor a number of variables such as contact, location, orientation, etc. of the mechanical parts by the same sensors there where traditionally different kinds of sensors were traditionally needed.

10 Claims, 5 Drawing Sheets

DEVICE FOR SENSING A STATE CHANGE IN A MECHANICAL SYSTEM, METHOD FOR MONITORING THE STATE OF A MECHANICAL SYSTEM AND USE OF SAID DEVICE

The present invention relates to a device for sensing a state change as described in the preamble of claim 1.

In industrial processes involving the manipulation of mechanical parts, in particular for machining, it is important to obtain and transmit signals corresponding to variables representing a certain state of the interaction among the mechanical parts, such as, for instance, whether two parts are touching each other or not, the quality of their contact, the position of a part respect to another one, etc.

A large number of sensors exists which are commonly used to obtain information concerning the variables mentioned above. These sensors are of various nature, such as, for instance, pressure sensors based on piezoceramics or other technologies, mechanical switches monitoring the positioning of certain parts, etc.

The use of proximity sensors or mechanical switches to obtain information concerning the existence or the quality of a contact among parts, is sometimes problematic in certain applications. In fact, sensors of this kind are often located between the surfaces to be brought in contact. This causes difficulties related to room, wear and brittleness that bring either to limitations and impediments to the application or to excessively increased realization costs.

Moreover, for certain applications, one must often measure a number of variables, each one representing a different aspect of the state of a mechanical system using a number of sensors of diverse nature, with substantial needs in terms of room and cost. Hence, it would be desirable to find a device with which it would be possible to measure or monitor several different state variables by using the same mechanical and electronic components.

The document DE-C-938 273 describes a method for measuring the force with which two metallic surfaces are pressed one against the other. This is obtained by measuring the ratio between the ultrasonic energy reflected by the interface formed by the contact of the said metallic surfaces and the ultrasonic energy traversing this interface.

It has been found that the ratio between the reflected and the transmitted portions is a function of the pressure pushing the surfaces one against the other.

According to the invention, these objectives are obtained by a sensing device such as the one mentioned above, which is characterized by the features mentioned in the characterizing part of claim 1.

The computation and comparison means can be able to produce an output signal comprising at least two values: one of them representing the existence of contact among independent parts of the said mechanical system, the other value representing the absence of contact.

According to the invention, the device can moreover comprise memorization means able to store a desired number of ranges of reference values and values of the output signal, together with display means able to display in an allocative fashion the advent of an output signal from the computation and comparison means corresponding to one of the value ranges.

The memorization means can include means for state selection and means for commanding write operations able to select a plurality of different states and to command the writing into the memorization means of the output signal value corresponding to each selected state.

According to the invention, the device can also include encoders able to measure the position of one or more among the independent parts. The set of emitting and receiving elements, together with the computation and comparison means would then be able to detect deformations or changes in the dimensions of the said parts.

A device in accordance with the invention can be a device for monitoring the state of a mechanical system. In this system one would monitor at least one of the states among the group of states listed in the followings: presence of an element, dimension, position, orientation and/or temperature of an element, state of transformation of the dimensions, position, orientation and/or temperature of an element, state of transformation of a physical or chemical property of an element.

The present invention relates also to a method for monitoring the state of a mechanical system in a process whose purpose is to transform the said state or in which the aim is to keep the system constantly in the said state. The method is characterized by the following steps:

set up a device for the detection of a state change, as mentioned above set up means for the memorization of reference values generate a sound signal from one or more emitting elements receive the said sound signal by one or more receiving elements, after that the sound signal has traveled through a propagation path formed by the parts of the mechanical system compare the received signal with the reference values and calculate and generate an output signal whose value depends on this comparison.

The output signal represents a particular state (e.g.: Contact=Yes or Contact=No) or denotes the degree to which this state is attained (e.g.: Degree of Contact=0.95 out of 1.00).

Moreover, a method in accordance with the invention can comprise a learning step during which values or ranges of values of the output signal and/or values or ranges of values of the signal at the receiving elements representing a set of selected states are stored in the memorization means.

According to the invention, the device can be used in a process having a need for the monitoring of the state of a mechanical system, such as a process where mechanical parts are manipulated or a process where the state changes of a mechanical system manifest themselves by modifying the system's sound propagation characteristics.

The invention will now be described in more details by referring to the following drawings, where FIG. 1 outlines a conceptual design for the prehension of a mechanical part by and between two other mechanical parts where the state of contact among the said parts as well as the location of the first part between the two other parts are monitored by a device in accordance with the invention;

Figure 1:
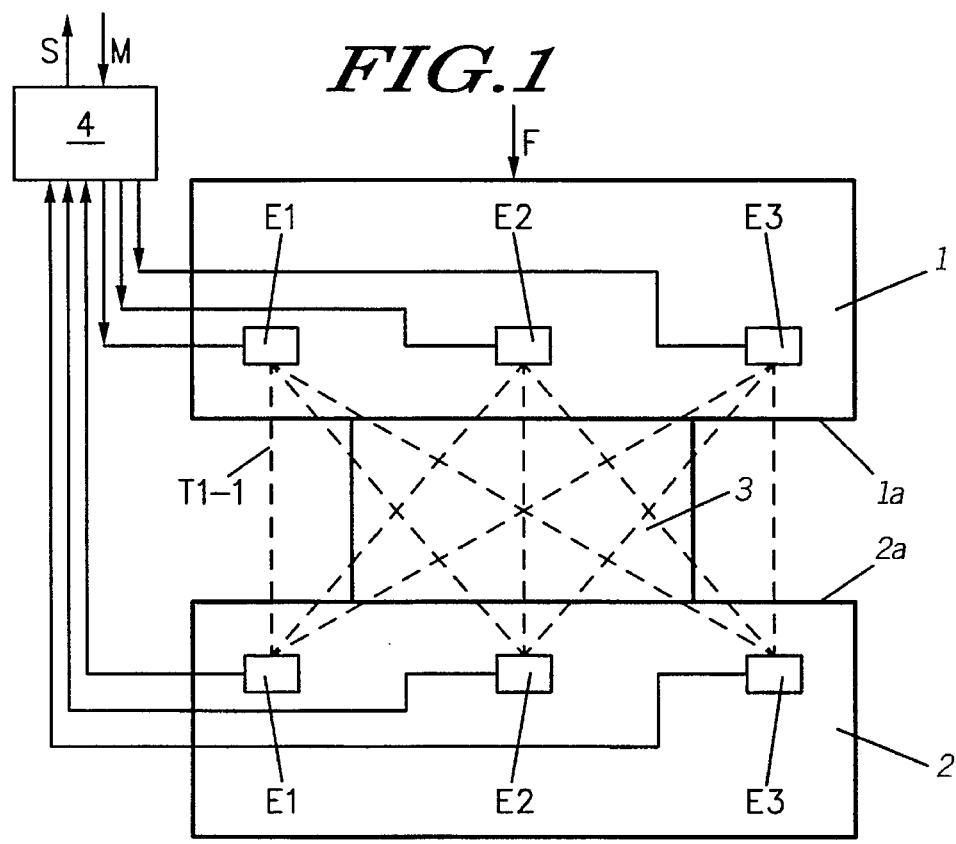

Turning now our attention to FIG. 1, we can distinguish two parts 1 and 2. Part 2 can be movable or stationary. Part 1 is apt to be moved against part 2 by means of a force F.

A mechanical part 3 is located between part 1 and part 2. The force F can be put into action with purpose of generating a prehension contact between parts 1 and 3 as well as between parts 2 and 3.

A similar application of force among parts as mentioned above will be applied, for instance, by claws of an industrial robot for the prehension of a part to be machined.

Inside of parts 1, at a certain distance or even at a relatively large distance from contact surface 1a and 2a of parts 1 and 2 respectively, are arranged one or more emitting elements E1, E2 and E3, as well as one or more receiving elements R1, R2 and R3. A control and computation unit 4 is connected to each on of the emitting and receiving elements. The unit 4 comprises an input M to set going, as well as an output S through which the output signal can be communicated to the mechanical system's operator or to a numerical control.

Under the control of the electronic unit 4, each emitting element E1, E2 and E3 is driven to emit sound signals that, after propagating inside the mechanical system's elements, will be received by each one of the receiving elements R1, R2 and R3. The unit 4 receives the electronic signals produced by the receiving elements to compare them with the signals emitted by the emitting elements with the purpose to compute the output signal.

In the most simple case, part 1 and part 2 would comprise only an emitting element and a receiving element, for instance, emitting element E2 and receiving element R2. The sound signal would be emitted by emitter E2, would propagate across the interface between parts 1 and 3, then through part 3, then across the interface between part 3 and part 2 and finally would be received by receptor R2.

Figure 4:
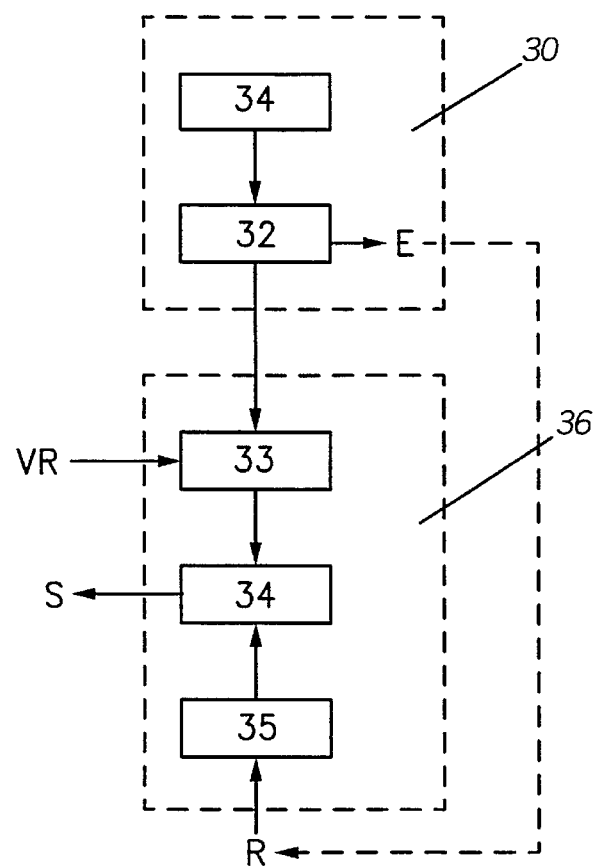
FIG. 4 shows a block schema of an electronic circuit for the control and the computation of an output signal of the device in accordance with the invention.

Also in the most simple case, as shown in FIG. 4, the amplitude of the sound signal emitted by E2 will be compared with the amplitude of the sound signal received by receptor R2 will be compared reference values and the difference between both amplitudes will be an indicator for the presence or the absence of contact among parts 1, 3 and 2.

In an idealized case, the amplitude of the signal received at receptor R2 in a situation where the contact among the three parts is established would be virtually identical with the amplitude of the signal as emitted by emitter E2, while in the absence of contact, the amplitude of the sound signal received at receiver R2 would be virtually zero. In a real case, obviously one cannot obtain such a simple response, because, even in a situation of a firmly established contact among the three parts, there is an attenuation of the signal propagating along the mentioned path by absorption as well as by diffraction, like for example the generation of echoes at the interfaces between two parts. To improve the crossing of the mentioned interfaces, one can profitably use low frequencies.

Figure 5:
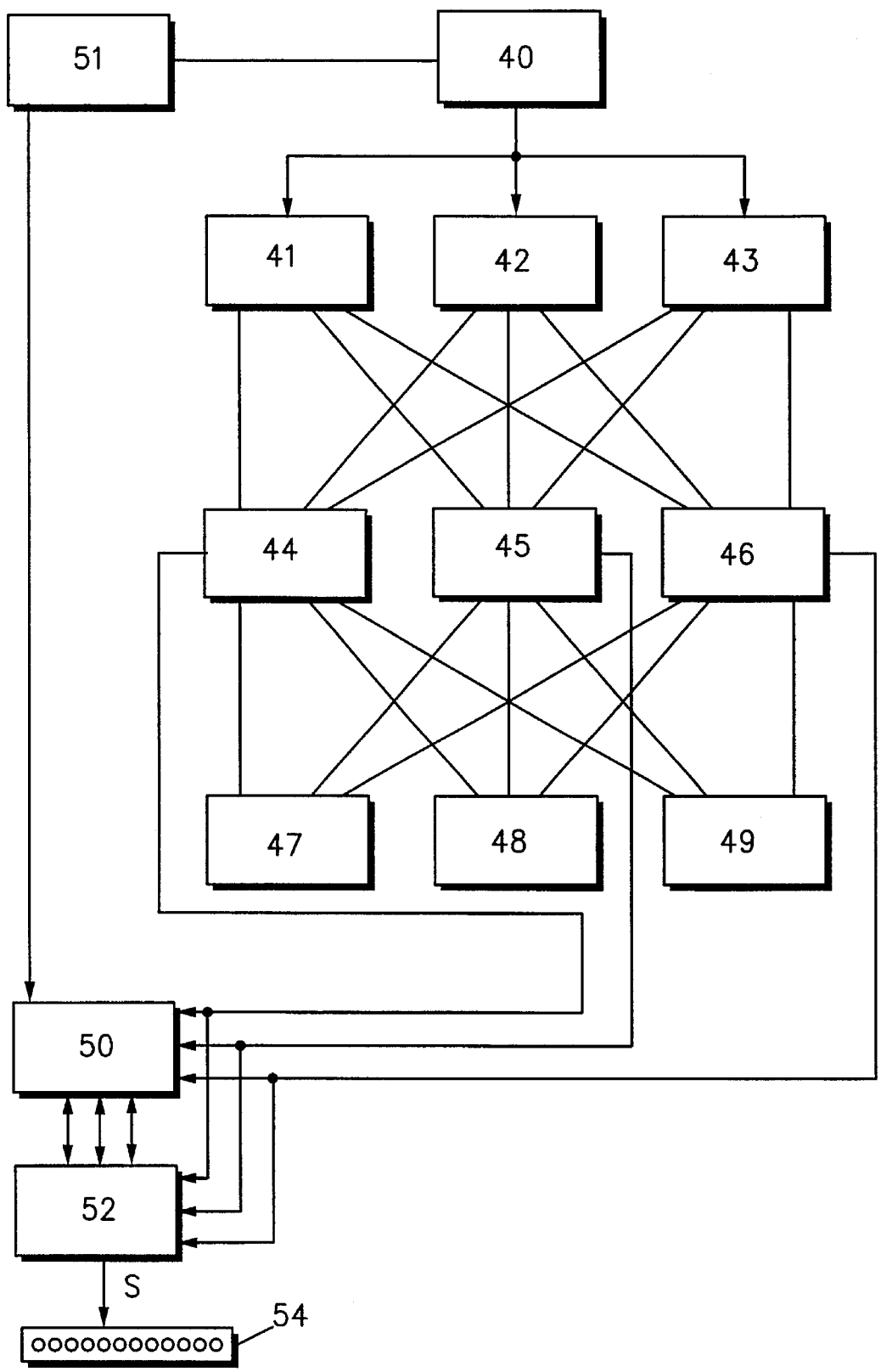
FIG. 5 shows the basic schema of FIG. 4 extended by certain additional functions.

In FIG. 1, three emitter and three receivers have been drawn, in such a way that each receptor can receive the signals emitted by each one of the three emitters. As indicated in FIG. 5, each received signal is compared with reference values with the purpose to simultaneously obtain information concerning both the quality of the contact among the three parts as well as the lateral positioning of part 3 in the gap between parts 1 and 2.

In a first approach, one can see that a coarse information is obtained by the fact that the position of part 3 shown in FIG. 1 allows the least attenuated reception of the signal emitted by emitter E2 in receptor R2. The signals emitted by emitters E1 and E3 are received very attenuated by receptor R2. Similarly, the signal emitted by emitter R2 is received very attenuated by receivers R1 and R3. The transmission between E1 and R1, as well as between E3 and R3 is virtually suppressed.

In reality, the suppression of the reception of the signals propagating along the diagonal lines in FIG. 1 is not complete, because the signals following those diagonal paths can also propagate along polygonal paths. Nevertheless the propagation time along a polygonal path would be necessarily longer than the propagation time along a direct path indicated by the dashed lines in FIG. 1. Thanks to this, a signal arriving late can be eliminated electronically.

In this way, one can obtain by the device shown in FIG. 1 an information on the exact lateral position of part 3 between parts 1 and 2. The resolution power of this information can be controlled by the number of emitting and receiving elements arranged across the contact surfaces 1a and 2a of parts 1 and 2, respectively.

An application example is given in FIG. 6a to 6i.

The process is described in FIG. 6a to 6f.

Figure 6A:
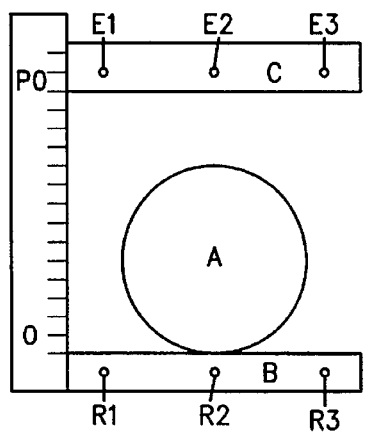
FIG. 6a to 6i show different steps of a mechanical process as well as diagrams showing the computation of the states.
Figure 6B:
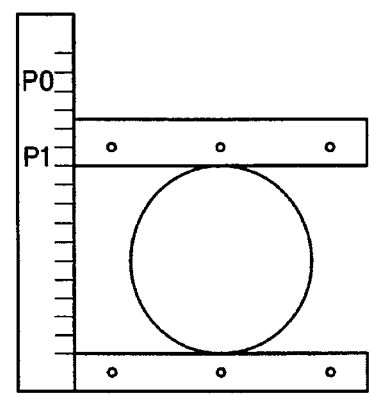
Figure 6C:
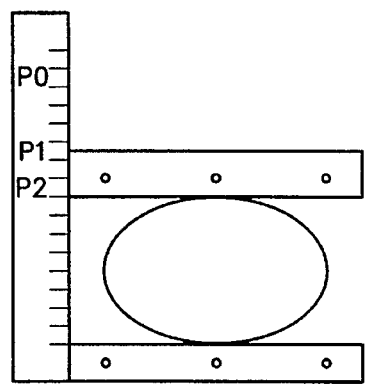
Figure 6D:
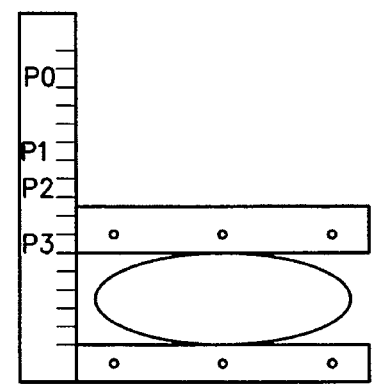
Figure 6E:
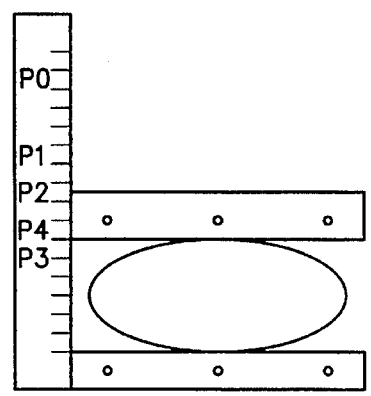
Figure 6F:
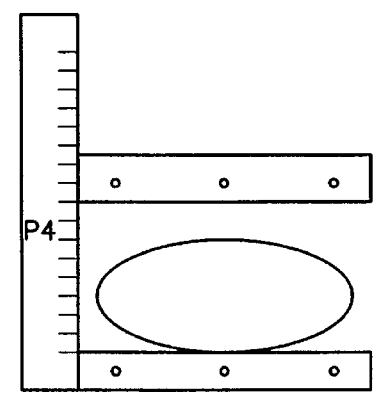

FIG. 6a shows a press, comprising a table B and a beam C. The beam moves vertically along a support D in which are mounted means to measure the beam position. The aim of the press is to flatten the cylindrical part A.

Initially (FIG. 6a), the beam is at position P0. During its descent, it makes contact with part A (FIG. 6b) when it is at position P1. By continuing its descent (FIG. 6c), it causes the deformation of part A. It stops at point P3 (FIG. 6d) and then it goes back up again. As a result of the residual elasticity of part A, the contact is broken only a little higher (position P4, FIG. 6e). The beam goes up a little bit more, up to and beyond the point where part A is completely loose.

On the beam are housed sound emitters (E1 to E3, FIG. 6a). On the table are housed sound receivers (R1 to R3, FIG. 6a). Emitters and receivers are housed well away from the contact surfaces, preferably in the parts of the press that house the interchangeable tools (not shown in the drawings) designed to fit the press for the flattening of parts of various shapes.

Figure 6G:
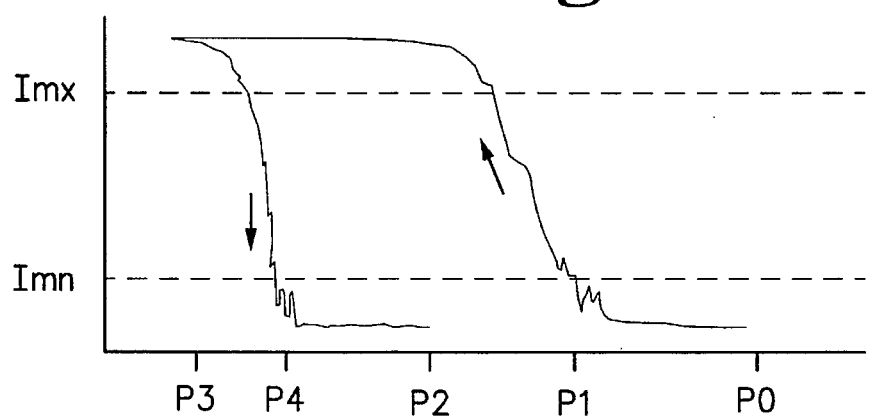

FIG. 6g shows the intensity I (non linear scale) of the sound signal measured in receptor R2 as a function of beam's position P. In this example, the signal has been emitted continuously by emitter E2.

Figure 6H:
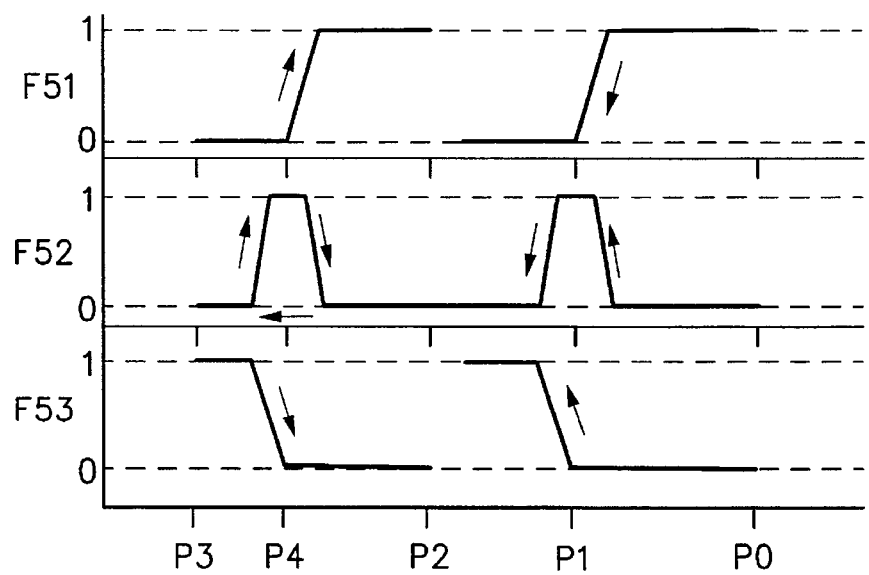

FIG. 6h shows a state description based on three fuzzy sets:

set FS1, which could also be named "part loose"

set FS2, which could also be named "phase of contact"

set FS3, which could also be named "part firmly hold"

Figure 6I:
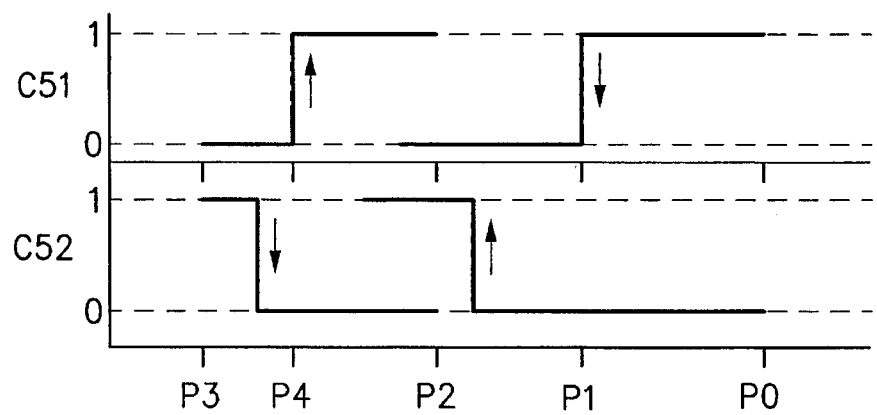

FIG. 6i shows a state description based on two binary values:

CS1, which could also be named "no contact"

CS2, which could also be named "maximum contact"

The exact method with which are calculated the values of the output signals corresponding to the state descriptions as a function of the received signals vary from application to application. FIG. 6g shows that in some ideal cases, the binary values of CS1 might correspond to an intensity above or below threshold Imn, while to obtain CS2, one would use a second threshold Imx. It is to notice that the high frequency variations (the irregular looking portion) of the intensity curve at the moments of contact making and of contact breaking might either be used as an indication of an important change (FS2), or, alternatively, be adequately handled by a smoothing method (FS1 and FS3).

In the followings, we will give some possible interpretations of these two alternative types of state descriptions shown by FIGS. 6h and 6i:

beginning of contact making:
- ◊ the system is in this state if FS1 <=0.5, FS2 >=0.5 and FS3 <=0.05
- ◊ this event is detected when CS1 goes from 1 to 0 (falling edge).

beginning of contact breaking:
- ◊ the system is in this state if FS1 <=0.5, FS2 >=0.05 and FS3 <=0.5
- ◊ this event is detected when CS1 goes from 0 to 1 (rising edge)

These interpretations could be used by a system controlling the press in the following manner.

Position P1, at the beginning of contact making, is used to check or measure the diameter of part A. This might require preliminary runs involving parts of known dimensions. Detecting the beginning of contact making might also trigger a pressure increase in the hydraulic circuit, in order to generate the force necessary to the flattening.

When the beginning of contact breaking is detected, the ascent could be stopped. Then, using positions P4, P3 and P1, the control system might compute an estimation of the final height of the flattened part. Should this estimated height be too large, a second corrective descent could be executed, aiming at a position lower than P3, otherwise, the ascent would be pursued. It is important to notice that the detection in advance of the loosening allows to stop without actually loosening the part. A corrective descent could be troublesome if the part had been loosened and slightly displaced.

By using a device in accordance with the invention, thanks to emitters E1 and E3 and receptors R1 and R3, it can be told, at least coarsely, whether part A is well positioned on the table. In the spirit of the invention, this would correspond to a certain degree of membership of the current state to the fuzzy set "well positioned part" or, alternatively, to the three fuzzy sets "part centrally located", "part on the left" and "part on the right".

Figure 2:
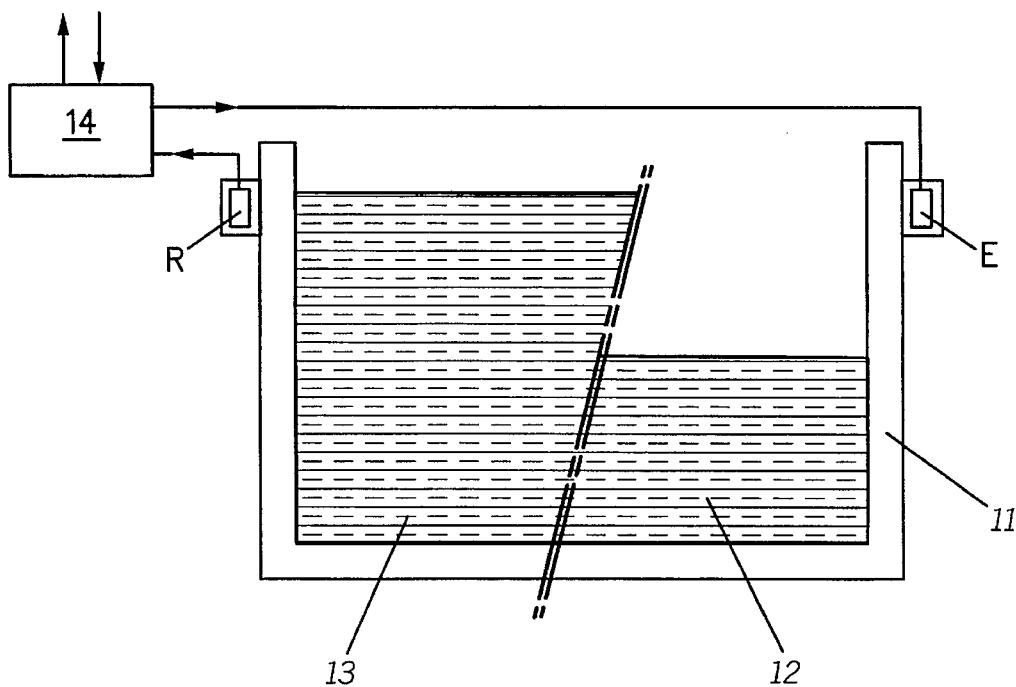
FIG. 2 shows the monitoring of a container's filling level by a device in accordance with the invention.
Figure 3:
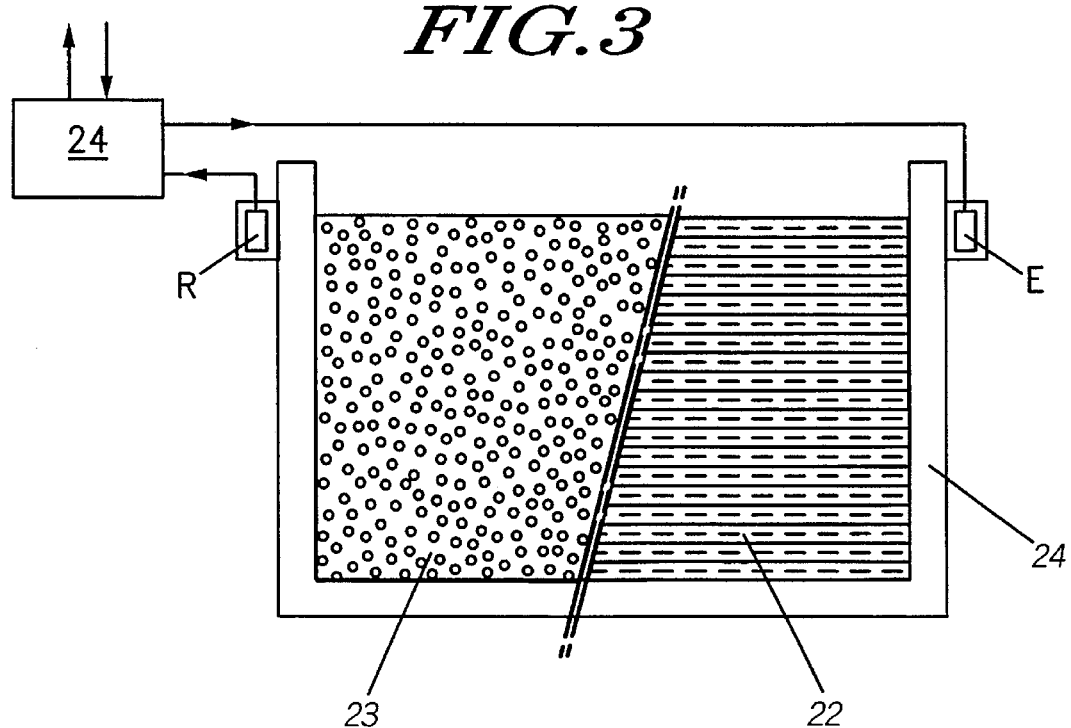
FIG. 3 shows the monitoring of a state change of a material located in a container; this change being monitored by a device in accordance with the invention.

FIG. 2 and FIG. 3 show a similar application of a device in accordance with the invention. A liquid material or a material in particles 12 and 22 are introduced into a container 11 and 21, respectively. The quality of transmission of a sound signal between emitter E and receiver R will be influenced in FIG. 2 by whether or not the filling level of container 11 by material 12 reaches the height of the path between emitting and receiving elements E and R. In FIG. 3 the control system E, R, 24 monitors the advent of a state change of material 22 to state 23, like for example the boiling of a liquid, the transformation in foam of a polymer, the changing of crystalline structure of a metal or any other change that would result in a modification of the acoustic properties of a material. In this application, receiver and emitter are arranged on the same part, but on different elements of the same part. Of course, one could imagine a multitude of different configurations of one or more parts where emitters and receivers are always positioned in such a way that the system state modification takes place between them.

The said modification of acoustic properties can occur by any kind of chemical or physical change of condition of a material, several of which have been mentioned as an example.

Turning now our attention to FIG. 4, we can distinguish a command means 30 comprising a clocking unit 31 as well as a command unit 32 able to produce signal commanding the emission of a sound signal by an emitting element such as E, E1, E2 or E3 of FIG. 1, 2 and 3. We can also distinguish a computation and comparison means 36, comprising a memory 33 where reference values VR are stored, a calculator 35 such as an amplitude calculator of the signal received by a receiving element R, R1, R2 or R3 of FIG. 1, 2 and 3 and comprising as well a comparator 34 for comparing amplitudes or other values such as those provided by elements 33 and 35.

Comparator 34 produces an output signal S which will be used afterwards directly by the operator for information only or to command either a display means or a control means of some process.

FIG. 5 presents an electronic circuit for the command, computation and comparison of the sound signals of a device in accordance with the invention, such as the one shown. This circuit comprises a clocking unit 40, a plurality of command units 41, 42 and 43 for the emitting elements E1, E2 and E3 of FIG. 1, a plurality of reading elements 47, 48 and 49 receiving the signals produced by the receiving elements such as R1, R2 and R3 of FIG. 1, as well as a number of comparators 44, 45 and 46 for comparing each one of values stored in memory 50 with the signals received by the receiver R1, R2 and R3. This memory can consist, for example, simply of one or more potentiometers or of a numeric memory.

Comparators 44, 45 and 46 can include circuits for the validation or the suppression of signals as a function of the time span between the emission and the reception, as mentioned above, as a function of the frequency in use or as a function of other criteria. The output signals of these comparators are communicated to a computing circuit 52 which is programmed to be able to emit output signals S as a function of the values and constellation of values of the signals received from comparators 44, 45 and 46. The output signal S is sent to the display means 54.

Moreover, according to FIG. 5, the circuit comprises a learning element 51, connected to the clocking unit 40 as well as to the memory 50. The function of the learning element 51 is as follows. With the aim to allow computing circuit 52 to attribute a given constellation of values of the signals of comparators 44, 45 and 46 to a given system state, each system state is taught to computing circuit 52 by simulating each one of these states by the mechanical system shown in FIG. 1 and by memorizing individual signals of comparators 44, 45 and 46 in a memory 50. This teaching method is commonly named learning by example. It is also possible to obtain the attribution of a certain state to a certain signal measured by other methods, in particular by applying thresholds or by a mathematical relation on the emitted signals, the received signals and, if need be, reference values.

Then the computing circuit 52 compares each advent of a constellation of signals received by comparators 44, 45 and 46 with the constellations stored in memory 50 and produces an output signal S as a function of the state stored in correspondence with the signals sent by the comparators.

Of course, to be able to distinguish, when this is necessary, the signals arriving to each receptor from different emitters, the sound signals emitted by emitters E1, E2 and E3 have each one a characterizing parameter, such as a differing frequency. The circuits for signal validation or suppression of comparators 44, 45 and 46 are able to attribute the signals that have to be compared.

The invention has been described above with the help of simple examples. It is understood that the principle of this invention can be applied well to more complicated mechanical systems, in which a device in accordance with the invention can be used to monitor a physical or chemical state change of at least one component. Such a state change can be produced for example by the deformation or by any kind of dimension modification of a mechanical part.

The information received from the device according to the invention could be combined with other parameters measured by other means to control a process, such as in the example of FIG. 6a to 6f where the degree of contact as well as the dimensions of a part are obtained.

I claim:

1. A device for sensing a state change of a mechanical system, said device comprising:

sensing means including a plurality of sound emitting elements and a plurality of sound receiving elements, either said sound emitting elements or said sound receiving elements being housed on a movable portion of said mechanical system, and the other of said sound emitting elements or said sound receiving elements being housed on a fixed portion of said mechanical system;

command means for controlling said sound emitting elements;

computation and comparison means operatively connected to said sound receiving elements, for comparing a received sound signal with a plurality of memorized values stored in a memorized means, said computation and comparison means producing an output signal corresponding to the distance between said sound emitting elements and said sound receiving elements indicative of various contacting and partial contacting states between said portions of said mechanical system.

2. A device for sensing a state change of a mechanical system (1, 2, 3) comprising at least two elements constituting one or more independent parts (1, 2, 11) comprising at least one sensing means for the measure of variables representing the state of the mechanical system, wherein the sensing means comprises at least one element (E) emitting a sound signal and at least one element (R) receiving the said sound signal, the emitting element being housed on or in a first one among the said elements of the mechanical system and the receiving element being housed on or in a second one among the elements of the mechanical system, the device comprising furthermore a command means (30) able to command the emission of a sound signal by the emitting element (E), as well as a computation and comparison means (36) able to compute an output signal (S) representing the state of the mechanical system by comparing a signal provided by the receiving element (R) with a plurality of memorized values (VR) stored in a memorization means (33, 50, 51);

wherein the receiving element is able to receive the sound signal transmitted from the emitting element across independent parts arranged in such a way as to build or not to build a transmission path (T1-1) for the sound signal, said transmission path having a transmission transparency varying as a function of said state of the mechanical system;

wherein the state of the mechanical system monitored by said device with the purpose to detect a change of said state is represented by the mechanical contact among the independent parts (1, 2, 3) of said mechanical system;

wherein the computation and comparison means (36) is able to produce an output signal having a plurality of values going from one extreme value of presence of contact to another extreme value of absence of contact among the independent parts of said mechanical systems, the intermediate values representing states of partial contact.

3. A device as set forth in claim 2, wherein the device further includes encoders able to measure the position of one or more independent parts, the emitting and receiving elements, together with the computation and comparison means (36) being thus able to detect deformations or changes in the dimensions of said parts.

4. A device as set forth in claim 2, wherein the state of the mechanical system monitored by said device is one or more among the following group: presence of an element, dimension, position, orientation and/or temperature of an element, state of transformation of dimensions, position, orientation and/or temperature of an element, state of transformation of physical or chemical property or state of an element.

5. Usage of a device as in claim 2, in a process having a need for monitoring the state of a mechanical system, wherein this process is a process in which mechanical parts are manipulated or deformed.

6. Usage of a device as set forth in claim 2, in a process having a need for monitoring the state of a mechanical system, wherein the state changes of mechanical systems manifest themselves by modifying the sound propagation characteristics of said system.

7. A device as set forth in claim 2, wherein the memorization means (50, 51) is able to memorize a desired number of value ranges of the output signal corresponding to the different states of the mechanical system, as well as a display means able to display in an allocative fashion the advent of an output signal coming from the computation and comparison means (36) corresponding to one of the value ranges.

8. A device as set forth in claim 7, wherein the memorization means (50, 51) comprises a means for state selection and commanding write operations (51) able to select a plurality of different states and to command the writing of the output signal corresponding to each state selected in the memorization means (50).

9. Method for monitoring the state of a mechanical system in a process producing a transformation of said state or in a process in which said state should be kept constant, characterized by the following steps:

setting up a device for the detection of state change as set forth in claim 2 setting up a means for the memorization of reference values emitting a sound signal by one or more of the emitting elements receiving said sound signal by one or more of the receiving elements, after that the signal has propagated through a transmission path formed by the parts of the mechanical system comparing the received signal with the reference values and compute and generate an output signal whose value depends on this comparison.

10. A method as set forth in claim 9, wherein there is moreover a learning step during which a plurality of constellations of signals of the receiving and emitting elements and optionally of the output signal representing a list of selected states are stored in the memory means.

* * * * *